United States Patent
Wagner

(10) Patent No.: US 10,920,835 B2
(45) Date of Patent: Feb. 16, 2021

(54) CLUTCH DEVICE

(71) Applicant: Schaeffler Technologies AG & Co. KG, Herzogenaurach (DE)

(72) Inventor: Marc Wagner, Croettwiller (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/333,291

(22) PCT Filed: Sep. 6, 2017

(86) PCT No.: PCT/DE2017/100744
§ 371 (c)(1),
(2) Date: Mar. 14, 2019

(87) PCT Pub. No.: WO2018/064999
PCT Pub. Date: Apr. 12, 2018

(65) Prior Publication Data
US 2019/0242439 A1    Aug. 8, 2019

(30) Foreign Application Priority Data

Oct. 7, 2016  (DE) .................... 10 2016 219 463.1

(51) Int. Cl.
*F16D 13/06* (2006.01)
*F16D 13/52* (2006.01)
(Continued)

(52) U.S. Cl.
CPC ........... *F16D 13/06* (2013.01); *F16D 1/0841* (2013.01); *F16D 13/52* (2013.01); *F16D 13/648* (2013.01);
(Continued)

(58) Field of Classification Search
CPC ...... F16D 13/683; F16D 13/52; F16D 13/648; F16D 13/06; F16D 1/0841; F16D 21/06;
(Continued)

(56) References Cited

U.S. PATENT DOCUMENTS

| | | | | |
|---|---|---|---|---|
| 2004/0134740 | A1* | 7/2004 | Gerathewohl | F16D 13/683 192/70.2 |
| 2012/0272503 | A1* | 11/2012 | Szuba | F16D 13/683 29/428 |
| 2014/0174877 | A1* | 6/2014 | Penz | F16D 13/683 192/70.12 |

FOREIGN PATENT DOCUMENTS

| | | |
|---|---|---|
| CN | 104279243 A | 1/2015 |
| DE | 102008038101 * | 8/2009 |

(Continued)

OTHER PUBLICATIONS

English language translation of WO2015/124154.*

*Primary Examiner* — Mark A Manley
(74) *Attorney, Agent, or Firm* — Kevin Parks

(57) ABSTRACT

A clutch device includes an outer disk carrier, outer disks, an inner disk carrier, inner disks, and at least one lug. The outer disk carrier has first axially running grooves, a first edge, and a first edge side. Each of the outer disks has radial projections spaced apart by depressions and projecting into the first axially running grooves. The inner disk carrier has second axially running grooves, a second edge, and a second edge side. Each of the inner disks has radial projections spaced apart by depressions and projecting into the second axially running grooves. The lug is arranged between two grooves of the first axially running grooves and extending axially from the first edge side, or arranged between two grooves of the second axially running grooves and extending axially from the second edge side.

9 Claims, 3 Drawing Sheets

(51) Int. Cl.
*F16D 13/64* (2006.01)
*F16D 1/08* (2006.01)
*F16D 21/06* (2006.01)
*F16D 13/68* (2006.01)

(52) U.S. Cl.
CPC ........... *F16D 13/683* (2013.01); *F16D 21/06* (2013.01); *F16D 2250/0023* (2013.01); *F16D 2300/12* (2013.01); *F16D 2300/26* (2013.01)

(58) Field of Classification Search
CPC ........... F16D 2250/023; F16D 2300/26; F16D 2300/12; F16D 2250/0084; F16D 13/646
See application file for complete search history.

(56) References Cited

FOREIGN PATENT DOCUMENTS

| | | |
|---|---|---|
| DE | 102012221444 A1 | 6/2013 |
| DE | 102012011819 A1 | 12/2013 |
| DE | 102014219951 A1 | 4/2016 |
| DE | 102014219961 A1 | 4/2016 |
| WO | 2015124154 A2 | 8/2015 |

\* cited by examiner

CLUTCH DEVICE

CROSS-REFERENCE TO RELATED APPLICATIONS

This application is the United States National Phase of PCT Appln. No. PCT/DE2017/100744 filed Sep. 6, 2017, which claims priority to German Application No. DE102016219463.1 filed Oct. 7, 2016, the entire disclosures of which are incorporated by reference herein.

TECHNICAL FIELD

The disclosure relates to a clutch device including at least one outer disk carrier with associated outer disks and at least one inner disk carrier with associated inner disks

BACKGROUND

Clutch devices of this type may be designed in the form of single clutches with an outer and an inner disk carrier, together with disks, or in the form of dual clutches with clutches arranged axially or radially one inside the other, each with an outer disk carrier and an inner disk carrier with associated lamellae, or disks. The outer and inner plates are arranged alternately to one another and form a plate stack which can be actuated by means of an actuating element. The actuating element is connected or coupled to an actuating device which introduces a force into the actuating element. In this way, the lamellae of the lamella stack are pushed together or pressed together in the axial direction, so that the torque flow between the outer plates and inner plates can be produced. Of course, it is likewise possible that an introduction of force into the actuating element leads to an opening of the plate pack.

The outer disk carrier and the inner disk carrier have a cylindrical basic shape in the respective section, in which the respective lamellae can also be accommodated, wherein axially running grooves are formed in this section so as to be distributed equidistantly around the circumference. Since the respective disk carrier usually consists of a formed sheet metal, a quasi meandering groove structure is formed.

For receiving and torque-transmitting coupling of the outer plates to the respective disk carrier, a plurality of radially outwardly projecting projections are formed in the manner of a tooth system are provided on the outer plates, spaced apart from each other by recesses. In a corresponding manner, a plurality of equidistantly spaced radial projections, spaced apart from one another by means of recesses, are formed on the inner circumference of the inner plates. In the course of assembly, the outer plates are now inserted into the outer plate carrier, for which purpose the radial projections of the outer plates are introduced into the axially running grooves on the inner circumference of the outer disk carrier. In a corresponding manner, the inner plates are pushed onto the inner plate carrier, in that the disk-side projections provided on the inner circumference are inserted into the axially running grooves formed on the outer circumference of the inner disk carrier.

During assembly, it is necessary to align the respective plate correctly with respect to the respective disk carrier, so that the projections are positioned exactly axially and circumferentially relative to the respective grooves. The projections then have to be quasi threaded into the grooves, in order to push the respective lamella into or onto the lamella carrier. This can be time-consuming.

SUMMARY

The disclosure includes a coupling device of the type mentioned above, characterized in that on the outer disk carrier and/or on the inner disk carrier, on the edge side, at least one axially extending lug arranged between two edge-side grooves for orientation of the outer and/or inner plates relative to the outer and/or inner plate carrier.

According to the disclosure, the outer disk carrier and/or the inner disk carrier, or both, includes at least one axially extending lug which is formed on the respective carrier in an axially projecting manner on the edge side. Said lug is formed in the region where two grooves open at the edge. The lug is located on the side from which the respective lamella is inserted. This lug is now used as a threading or centering element, that is to say for aligning the lamellae with respect to the carrier. In the course of assembly, it is only necessary to introduce the lug into a depression provided between two arbitrary radial projections on the respective lamella or, when the respective lamella is installed, to guide the depression virtually to the lug, so that the lug engages in the recess. In this way, the plate is fixed relative to the respective disk carrier; it is only necessary to pivot the plate slightly to the one or the other side, so that it lies on the disk carrier axis. Then, all the disk-side projections are automatically positioned and aligned with respect to the support-side grooves and the lamella can be inserted or pushed in without any problems.

The lug consequently allows very easy threading or centering of the respective groove on the respective support, so that the loading of the respective carrier with the lamellae can be carried out rapidly.

The at least one lug may be integrally formed with the respective outer or inner disk carrier. As described, these are usually a shaped component made of sheet metal. Within the scope of this shaping, it is easily possible to arrange the lug at the outer edge of the cylindrical support section, from which side the lamellae are installed.

Although it is already sufficient to provide only one axially extending lug, it is of course conceivable, to provide a plurality of axially extending lugs around the circumference of the edge of the outer disk carrier and/or of the inner disk carrier. For example, three such lugs can be provided, which may be positioned equidistantly, in this case offset by 120° about the circumference. When threading the respective lamella, it can, for example, be placed on a first lug, so that the latter engages in the lamella-side depression, after which a further lug is still "sought" and has to be introduced into the plate-side depression, whereupon complete centering and alignment is provided, since the disk is positioned over the lugs.

Alternatively to the use of two, three, four or more lugs, it is of course also conceivable for an axially extending lug to be provided between all adjacent grooves of the outer disk carrier and/or of the inner disk carrier. In this case, a completely circumferential edge-side lug profile is virtually provided.

To guide the plate-side projections into the corresponding grooves in a simple manner after the "threading" of the lugs, the lugs may be rounded. Thus, in a radial plan view, the lug is rounded or undulating, i.e., it runs continuously into or out of the carrier edge. The lateral, rounded surfaces form guide surfaces on which an adjacent projection can slide into the groove during fitting.

Alternatively to the formation of a rounded lug, it is also conceivable to design the lugs on both sides with oblique surfaces. In a radial plan view, that is to say a side view, such a lug virtually has a trapezoidal shape. Here, too, the oblique surfaces of the lug act as guide surfaces, which guide the respective adjacent projection automatically into the groove associated with the lug during fitting.

The disclosure also relates to a method for mounting an outer or inner plate on an outer or inner disk carrier of a coupling device. An outer disk carrier or an inner disk carrier is provided with at least one lug provided on the edge side between two grooves, extending axially and serving to align the outer or inner plate relative to the outer and/or inner plate carrier. Outer plates having radial projections which are spaced apart from one another by means of recesses on the outer circumference, or inner plates with radial projections which are spaced apart from one another by means of recesses on the inner circumference are attached to the lug such that the lug engages between two adjacent projections of the outer or inner plate. The outer or inner plate is aligned with its projections relative to the grooves of the outer or inner disk carrier and the projections are inserted into the grooves.

Furthermore, according to the method, provision can be made for an outer or inner disk carrier to be provided with axially extending lugs around the circumference of the edge of the outer disk carrier and/or of the inner disk carrier, or with projections which are arranged between all adjacent grooves of the outer disk carrier or of the inner disk carrier.

Furthermore, according to the disclosure, an outer or inner lamella carrier can be used with one or more rounded lugs having oblique surfaces on both sides.

BRIEF DESCRIPTION OF THE DRAWINGS

The disclosure is explained below on the basis of exemplary embodiments with reference to the drawings. The drawings are schematic illustrations and show.

DETAILED DESCRIPTION

Figure 1:
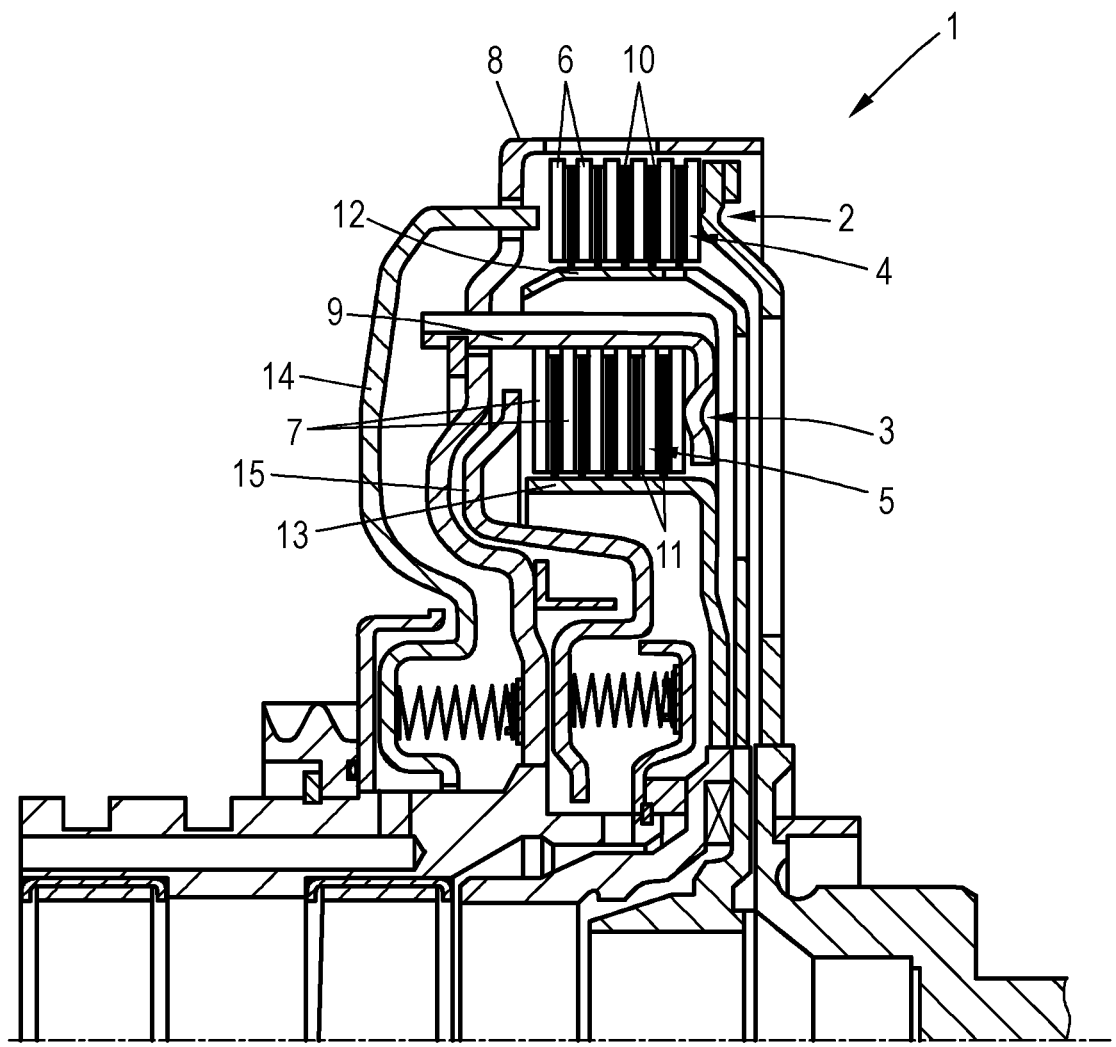
FIG. 1 is a schematic representation in the form of a sectional view of the essential components of a clutch device according to the invention.

FIG. 1 shows, in the form of a sectional schematic view, a clutch device 1 according to the disclosure, here, by way of example, in the form of a wet-running dual clutch. The disclosure is purely by way of example and in no way restrictive, neither with regard to the type of the coupling device nor with regard to the structure. Instead of a double clutch, the clutch device could be a single clutch. The radially constructed dual clutch can also be constructed in an axial manner.

The clutch device 1 shown here has two partial clutches 2 and 3 arranged radially with respect to one another. Each partial clutch comprises a disk set 4, 5, wherein each disk set 4, 5 has outer disks 6, 7, which are arranged in an axially displaceable manner on a respective outer disk carrier 8, 9, and inner plates 10, 11, which are arranged in an axially displaceable manner on a respective inner disk carrier 12, 13.

For example, the outer plates 6, 7 are steel plates, while the inner plates 10, 11 are friction plates having a friction lining.

Each plate stack can be axially pushed together via an actuating element, here in the form of a respective pressure pot 14, 15, are in such a way that the outer plates 6, 7 and the inner plates 10, 11 are in frictional engagement with one another and the respective partial clutch 2, 3 is closed. In this way, a torque can be transmitted from the respective outer disk carrier 8, 9 to the inner disk carrier 12, 13. The outer disk carriers 8, 9 are connected to a common input shaft, while the respective inner disk carriers 12, 13 are each connected to a separate output shaft.

The structure of such a coupling device is sufficiently known and does not require any further explanation.

Figure 2:
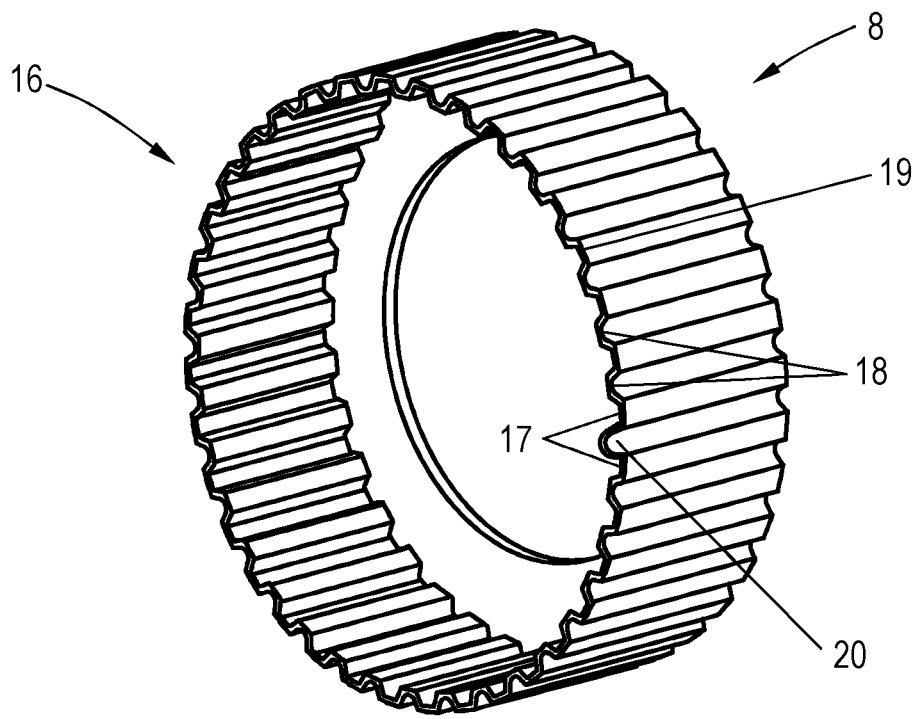
FIG. 2 is a perspective view in the form of a schematic representation of an outer disk carrier.

FIG. 2 shows, by way of example, an outer plate carrier. Here, the outer disk carrier 8 is shown. In a similar manner, the outer disk carrier 9 is constructed to be slightly smaller around the circumference.

The outer disk carrier 8 has a substantially cylindrical section 16 on which a plurality of axially running grooves 17 are formed, between which project radially inwardly extending elevations 18 forming a type of toothing. Between two grooves, which open out at the edge 19 of the outer disk carrier 8, an axially extending lug 20 is formed on the edge of an elevation 18 or tooth, which serves as an insertion and centering element for threading in an outer plate 10. Said lug 20 is preferably formed in one piece with the outer shell insert 8, which is a sheet metal forming component, and is therefore formed in the course of the punching and shaping operation of the outer plate carrier 8.

Figure 3:
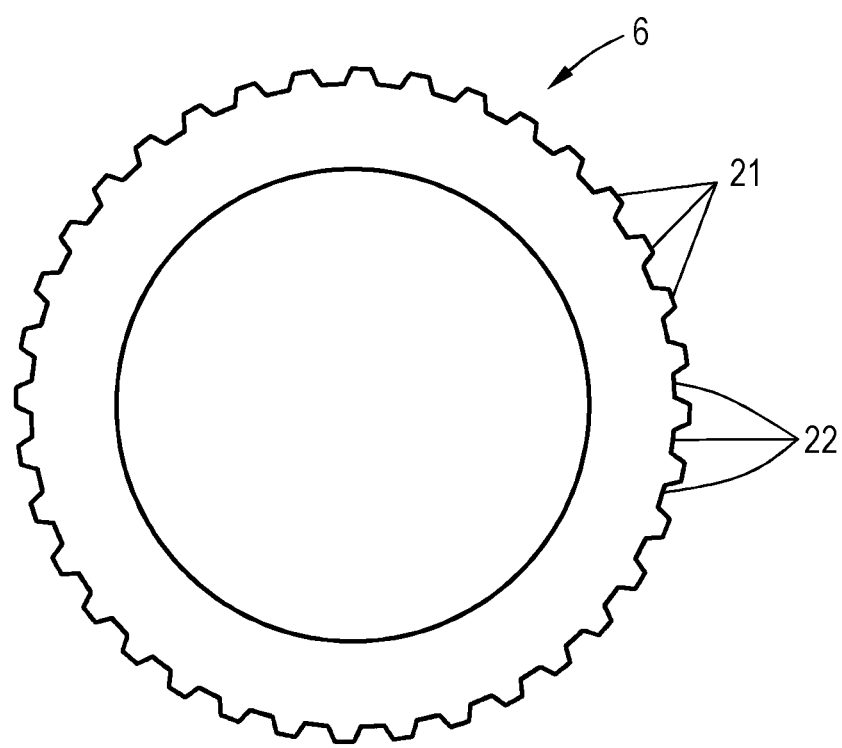
FIG. 3 is a top view of an outer plate to be inserted into the outer disk carrier of FIG. 2.

FIG. 3 shows a plan view of an outer plate 6, which is of annular design and has a plurality of radially projecting projections 21 on its outer circumference, between which recesses are provided in each case. Thus, a complementary tooth system is formed. On the fully configured clutch device 1, the projections 21 of the outer disk 6 engage in the grooves 17 of the outer disk carrier 8, while the elevations 18 of the outer disk carrier lie in the depressions 22 of the outer lamellae 6. Thus, an engagement of the radial outer toothing of the outer plate 6 into the radial inner toothing of the outer disk carrier 8 is provided.

Figure 4:
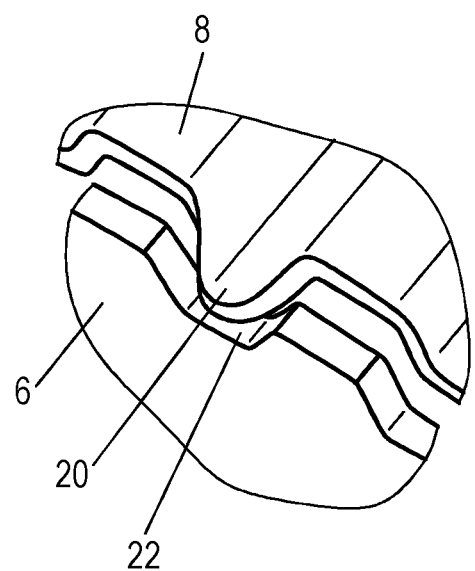
FIG. 4 shows a partial view of the outer disk carrier and of the outer disk with the carrier-side lug inserted into the plate-side recess.

In order to be able to align the respective outer plate 6 exactly with respect to the outer disk carrier 8 in a simple manner within the scope of fitting, so that the projections 21 can consequently be positioned axially and in the circumferential direction exactly relative to the grooves 17 and the outer plate 6 can be pushed into the outer plate carrier 8 in a simple manner, the lug 20 is initially introduced into a recess 22 of the outer plate 6 in a simple manner during assembly, as shown in FIG. 4. With this introduction, a type of centering is provided, that is to say, at least in this region, the outer plate 6 is positioned correctly with respect to the outer disk carrier 8. It is then merely necessary to align the outer plate 6 with respect to the central axis of the outer disk carrier 8 by slight pivoting. If this is done, all the projections 21 are positioned exactly in the axial and circumferential direction relative to the grooves 17.

The outer lamella 6 can then be inserted into the outer lamellae of the carrier 8 in a simple manner, and the toothings engage with one another.

Of course, although not shown in greater detail here, the respective inner lamellar carrier 12, 13 can also be provided with such a lug 20. The inner plates 10, 11 have the corresponding toothing, that is to say the projections and depressions, on the inner circumference, while the grooves into which the projections provided on the inner circumference engage are provided on the inner disk carrier 12, 13 on the outside. Here, too, the fitting is very simple if such an axially projecting lug 20 is formed on the inner disk carrier 12, 13.

Although only one lug 20 is provided in the exemplary embodiment shown, it is of course conceivable, to form further lugs 20 which may be distributed equidistantly around the circumference. For example, a second lug 20 can be provided at a position opposite to 180°, or three lugs which are offset by 120° and are likewise used as threading and centering elements.

In principle, it is conceivable to provide an axially projecting lug 20 in the region of each elevation.

Figure 5:
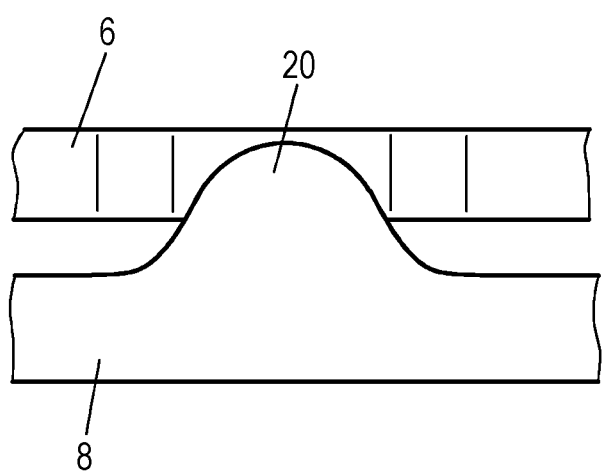
FIG. 5 shows a plan view of the arrangement of FIG. 4.

As FIGS. 4 and 5 show, the lug 20 is rounded, i.e., it is quasi wave-shaped and runs continuously into and out of the edge of the edge. The round side faces form guide surfaces for the respectively adjacent projection 21 of the outer plate 6, so that the latter slides into the respective groove during fitting.

REFERENCE SYMBOLS

1 Clutch device
2 Partial clutch
3 Partial clutch
4 Disk set
5 Disk set
6 Outer plate
7 Outer plate
8 Outer disk carrier
9 Outer disk carrier
10 Inner plate
11 Inner plate
12 Inner disk carrier
13 Inner disk carrier
14 Pressure pot
15 Pressure pot
16 Cylindrical section
17 Groove
18 Elevation
19 Rim
20 Lug
21 Projection
22 Recess

The invention claimed is:

1. A clutch device comprising:
an outer disk carrier comprising a first plurality of axially running grooves and a first radially inwardly extending tooth disposed between two circumferentially adjacent grooves of the first plurality of axially running grooves;
a plurality of outer disks, each including a first plurality of radial projections spaced apart from one another by depressions and projecting into the first plurality of axially running grooves;
an inner disk carrier comprising a second plurality of axially running grooves and a second radially inwardly extending tooth disposed between two circumferentially adjacent grooves of the second plurality of axially running grooves;
a plurality of inner disks, each including a second plurality of radial projections spaced apart from one another by depressions and projecting into the second plurality of axially running grooves; and,
at least one lug:
arranged between the two circumferentially adjacent grooves of the first plurality of axially running grooves, spanning an entirety of a circumferential width between the two circumferentially adjacent grooves of the first plurality of axially running grooves, including tapered edges and a rounded distal end, and extending axially from the first radially inwardly extending tooth; or,
arranged between the two circumferentially adjacent grooves of the second plurality of axially running grooves, spanning an entirety of a circumferential width between the two circumferentially adjacent grooves of the second plurality of axially running grooves, including tapered edges and a rounded distal end, and extending axially from the second radially inwardly extending tooth.

2. The clutch device of claim 1 wherein the at least one lug is a plurality of lugs arranged around a circumference of the outer disk carrier or the inner disk carrier.

3. The clutch device of claim 2, wherein the plurality of lugs are distributed equidistantly around the circumference.

4. The clutch device of claim 1, wherein the at least one lug is a plurality of lugs extending axially from:
respective first radially inwardly extending teeth disposed between all circumferentially adjacent grooves of the outer disk carrier; or
respective second radially inwardly extending teeth disposed between all circumferentially adjacent grooves of the inner disk carrier.

5. The clutch device of claim 1, wherein the at least one lug includes first and second sides with respective oblique surfaces.

6. The clutch device of claim 1 wherein the clutch device is a dual clutch having two partial clutches.

7. A method for mounting an outer plate on an outer disk carrier or an inner plate on an inner disk carrier of a clutch device, comprising:
providing:
outer lamellae with projections and recesses on an outer circumference; or,
inner lamellae with projections and recesses on an inner circumference;
providing:
an outer disk carrier comprising a first edge side, a plurality of grooves that open at the first edge side, a plurality of radially inwardly extending teeth disposed between respective pairs of circumferentially adjacent grooves of the plurality of grooves, and at least one axially extending lug extending from a one of the plurality of radially inwardly extending teeth, the at least one axially extending lug spanning an entirety of a circumferential width between a pair of circumferentially adjacent grooves and including tapered edges and a rounded distal end; or,
an inner disk carrier comprising a second edge side, a plurality of grooves that open at the second edge side, a plurality of radially inwardly extending teeth disposed between respective pairs of circumferentially adjacent grooves of the plurality of grooves, and at least one axially extending lug extending from a one of the plurality of radially inwardly extending teeth, the at least one axially extending lug spanning an entirety of a circumferential width between a pair of circumferentially adjacent grooves and including tapered edges and a rounded distal end, wherein the at least one axially extending lug is for aligning the outer lamellae or the inner lamellae relative to the outer disk carrier or the inner disk carrier, respectively;

installing the outer lamellae or the inner lamellae on the at least one axially extending lug such that the lug is arranged between two adjacent projections of the outer lamellae or the inner lamellae; and, installing the projections into the plurality of grooves.

8. The method of claim 7, wherein:

the at least one axially extending lug is a plurality of axially extending lugs; and, a lug of the plurality of axially extending lugs is arranged between all adjacent grooves of the outer disk carrier or the inner disk carrier.

9. The method of claim 7 wherein the at least one axially extending lug includes first and second sides with respective oblique faces.

\* \* \* \* \*